(12) United States Patent
Audet

(10) Patent No.: US 6,266,006 B1
(45) Date of Patent: Jul. 24, 2001

(54) ARROW DETECTOR

(76) Inventor: Jocelyn Audet, 5520 Seventh St. SE., Minot, ND (US) 58701

( * ) Notice: Subject to any disclaimer, the term of this patent is extended or adjusted under 35 U.S.C. 154(b) by 0 days.

(21) Appl. No.: 09/487,833

(22) Filed: Jan. 19, 2000

Related U.S. Application Data

(60) Provisional application No. 60/123,703, filed on Mar. 8, 1999.

(51) Int. Cl.[7] ....................................................... H04B 7/00
(52) U.S. Cl. ........................... 342/350; 324/326; 473/578
(58) Field of Search .............................. 342/350; 324/326, 324/327, 329; 473/578

(56) References Cited

U.S. PATENT DOCUMENTS

| | | |
|---|---|---|
| 3,828,242 * | 8/1974 | Vann . |
| 5,094,463 | 3/1992 | Dryden .................................. 273/416 |
| 5,157,405 | 10/1992 | Wycoff et al. ........................ 342/386 |

* cited by examiner

*Primary Examiner*—Theodore M. Blum
(74) *Attorney, Agent, or Firm*—Westman, Champlin & Kelly, P.A.

(57) ABSTRACT

A metal detector for detecting missing arrows includes a housing having a fastener for mounting to an arrow shaft. The detector includes an antenna, a circuit connected to the antenna for detecting the proximity of metallic arrow parts to the antenna, and an indicator connected to the circuit for indicating that the circuit detects the proximity of the antenna to a metal arrow part. Preferably, the housing includes a generally planar paddle portion supporting the antenna and a generally planar handle portion, the portions being at different parallel planes. The fastener includes a recess in the handle portion for receiving the end of the arrow shaft and a threaded fastener for fastening to a threaded recess on the arrow shaft extending into the recess.

20 Claims, 3 Drawing Sheets

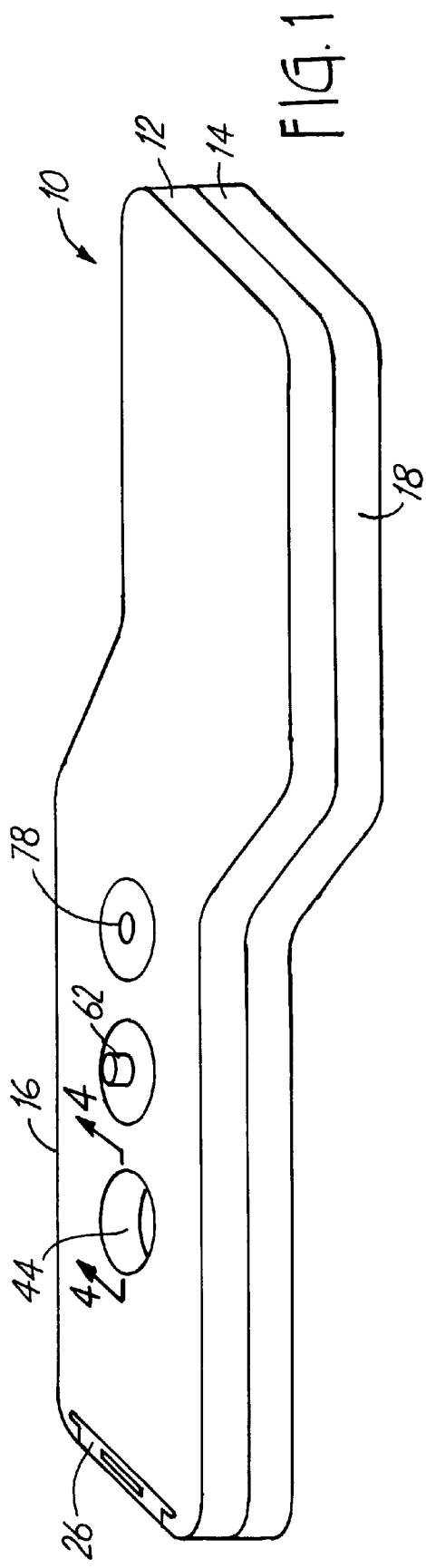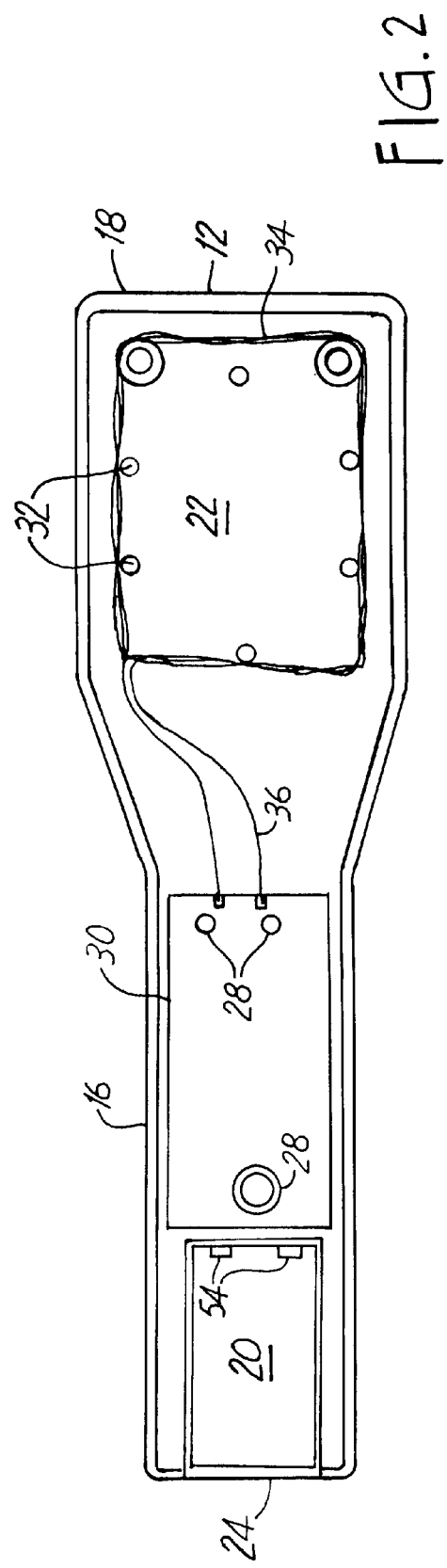

ARROW DETECTOR

CROSS-REFERENCE TO RELATED APPLICATION

This application claims benefit of Provisional Application No. 60/123,703, filed Mar. 8, 1999, for ARROW DETECTOR by Jocelyn Audet.

BACKGROUND OF THE INVENTION

This invention relates to detection of lost arrows, and particularly to a metal detector for mounting on an arrow shaft to enable a user to detect lost arrows.

Bow hunters and archers occasionally lose arrows in the field upon missing a target. While the general location of the arrow is known to the hunter or archer, the exact location often is not. More particularly, arrows might be lost in brush or other thick underbrush, making them difficult to see by the hunter or archer.

Dryden in U.S. Pat. No. 5,094,463 and Wycoff et al. in U.S. Pat. No. 5,157,405 proposed techniques to locate lost arrows by placing transmitters iii the point or shaft of the arrow such that the transmitter transmits signals to a receiver carried by the hunter or archer, thus enabling the hunter or archer to locate the lost arrow. However, because hunters and archers typically shoot several arrows before retrieving any, several arrows must be fitted with the transmitter, thereby adding to the cost of the detection system. Moreover, these devices alter the weight and balance of the arrow shaft, thereby affecting the trajectory of the arrow. Some devices, such as that proposed by Wycoff et al., employ antennas fastened to the external surface of the shaft. These external antennas alter the aerodynamics of the arrow and affect the trajectory of the arrow. Usually, the effects of altered weight, balance and aerodynamics cannot be compensated by the hunter or archer, so arrow trajectory becomes more uncertain. There is, therefore, a need for a simple, effective detection device for detecting the lost arrow.

SUMMARY OF THE INVENTION

The present invention is directed to a metal detector for mounting to an arrow shaft to enable the user to detect missing arrows by locating the metallic arrow point or shaft of the missing arrow. The metal detector includes a housing having a fastener for fastening to an arrow shaft fastener. A metal detector is supported by the housing. The detector includes an antenna, a circuit connected to the antenna for detecting the proximity of metal arrow points, shafts and the like to the antenna, and an indicator connected to the circuit for indicating that the circuit detects the proximity of the antenna to a metal arrow point, shaft or the like.

In a preferred embodiment of the invention, the housing includes a generally planar paddle portion supporting the antenna and a generally planar handle portion. The paddle and handle portions are at different parallel planes to enable a user to orient the antenna closer to ground locations than the handle.

A typical arrow shaft has a generally cylindrical external surface and a generally planar end surface normal to a cylindrical external surface. A threaded recess in the end of the arrow shaft receives a threaded fastener of an arrow point. The end of the arrow shaft is received in a recess in the handle portion of the metal detector, and a threaded fastener extends into the recess so that the arrow shaft may be fastened to the housing.

Advantageously, the recess receiving the arrow shaft has a generally planar bottom surface arranged to engage the end surface of the arrow shaft to secure the arrow shaft to the housing.

In another form of the invention, a method is provided for locating a missing arrow. A metal detector has a fastener arranged to fasten to an end of an arrow shaft so that the metal detector extends from the end of the arrow shaft. The metal detector is operated while the user grasps the arrow shaft and extends the arrow shaft to position the metal detector to locations likely to contain the missing arrow.

BRIEF DESCRIPTION OF THE DRAWINGS

FIG. 1 is a perspective view of a metal detector according to the presently preferred embodiment of the invention.

FIGS. 2 and 3 are plan views illustrating the inside of opposite halves of the housing illustrated in FIG. 1.

DETAILED DESCRIPTION OF THE ILLUSTRATIVE EMBODIMENTS

Figure 3:
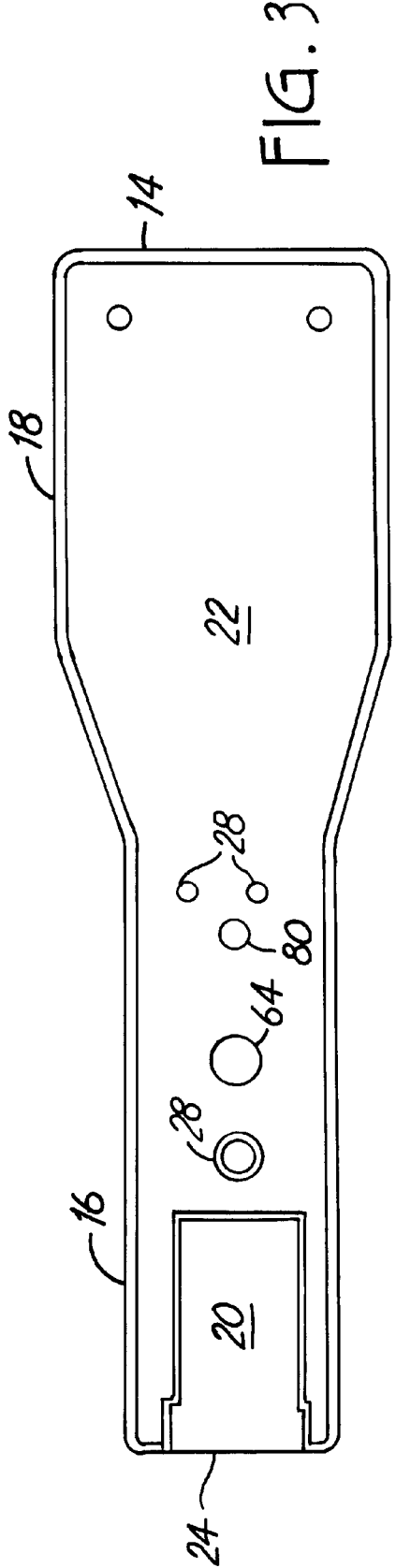

FIGS. 1–4 illustrate a housing 10 for a metal detector for use in detecting arrows in accordance with the presently preferred embodiment of the present invention. Housing 10 includes housing halves 12 and 14 fastened together with suitable fasteners (not shown). The housing includes a generally planar handle portion 16 and a generally planar paddle portion 18, positioned in different, substantially parallel planes with a sloped transition region between. Hence, housing 10 is shaped somewhat like a spatula. The inside of the housing, illustrated particularly in FIGS. 2 and 3, define a battery cavity 20 and a circuit cavity 22. Cavity 20 is in a rearward portion of handle portion 16 and is exposed to an end 24 of the housing. Removable cover 26 engages slots 28 in the housing halves to close the battery cavity 20. Cavity 22 is formed in a forward portion of handle portion 16 and in paddle portion 18. Cavity 22 includes stand-offs 28 to support a circuit board 30, shown in dashed lines in FIG. 2. Stand-offs 32 in the paddle region of housing half 12 form a guide for the loop of antenna 34. Antenna 34 is connected by wires 36 to circuit board 30.

Figure 4:
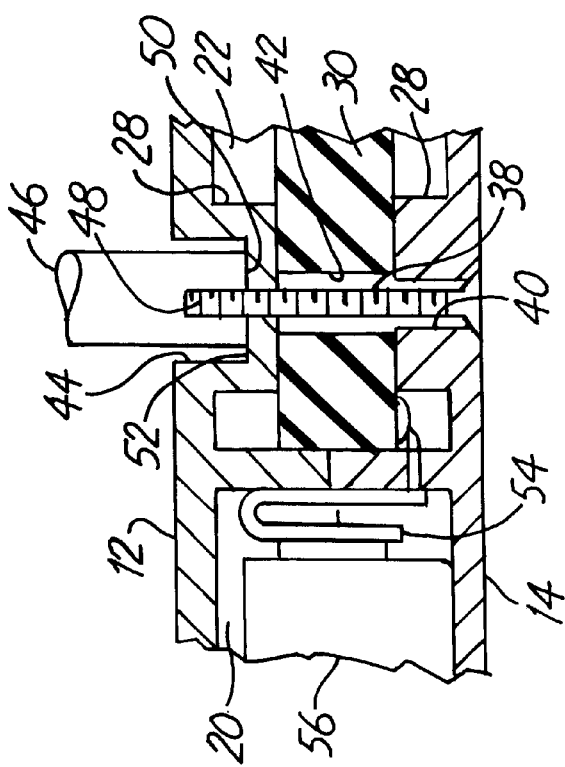
FIG. 4 is a section view taken along plane 4—4 in FIG. 1.

As shown particularly in FIG. 4, a threaded fastener, such as a screw, extends through aperture 40 in one of stand-offs 28 in lower housing 14, and through aperture 42 in circuit board 30, to threadably fasten to the confronting stand-off 28 in housing half 12. Hence, fastener 38 is one of the several fasteners fastening housing halves 12 and 14 together. The head of fastener 38 is preferably recessed into the external surface of housing half 14. The threaded portion of fastener 38 extends centrally into recess 44 formed in the external surface of half 12. Arrow shaft 46 includes a threaded recess 48 arranged to engage fastener 38. Typically, shaft 46 includes a planar end surface 50 generally normal to the cylindrical surface of the shaft. Recess 44 includes a planar bottom surface 52 arranged to engage surface 50 of the arrow shaft.

As shown particularly in FIG. 4, the end of battery cavity 20 includes a pair of contacts 54 electrically connected to circuit board 30 and arranged to engage respective contacts of battery 56. In a preferred embodiment, battery 56 is a standard 9 volt battery.

Figure 5:
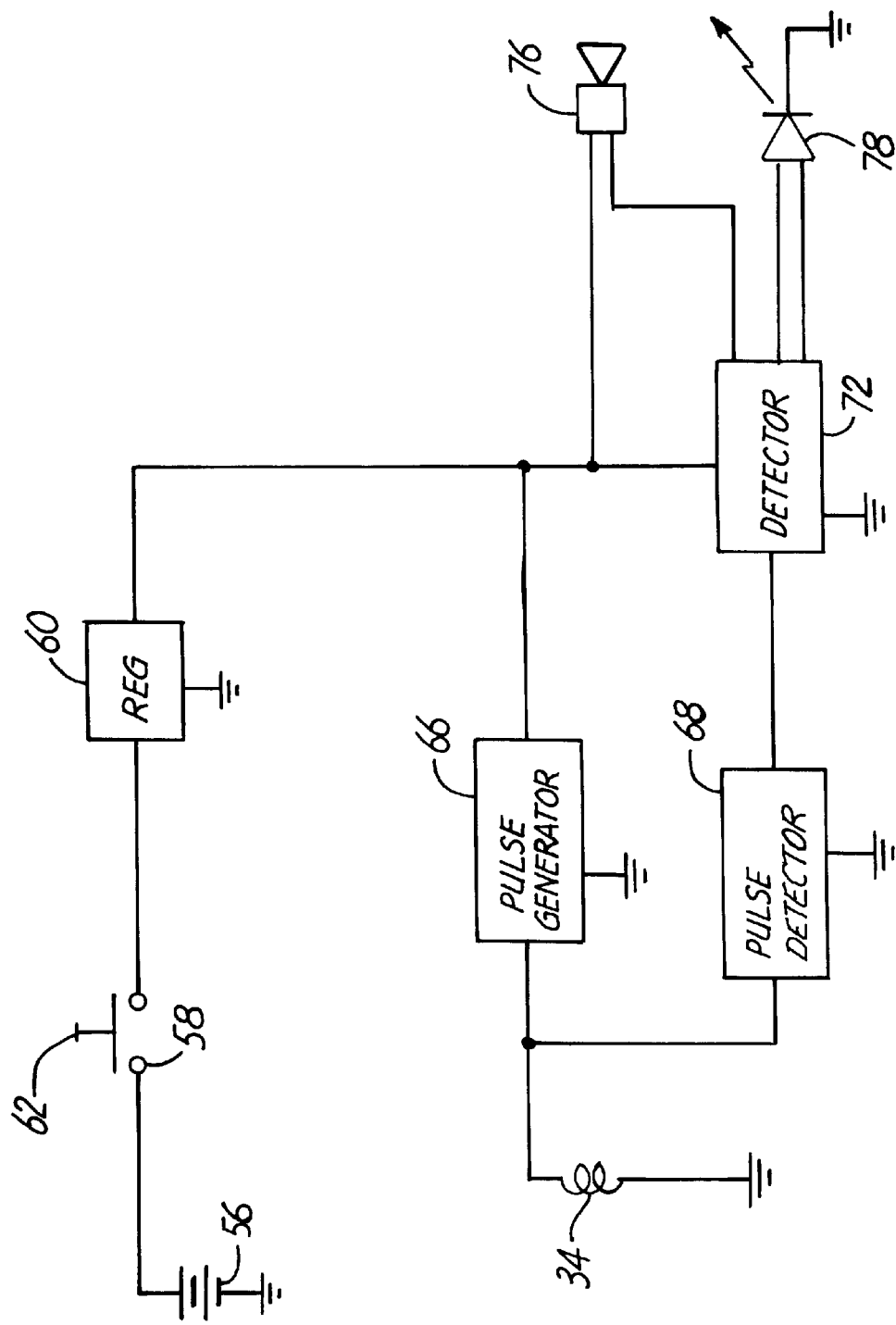
FIG. 5 is a block diagram of a circuit of the metal detector housed in the housing of FIGS. 1–3.

FIG. 5 illustrates a circuit diagram of the metal detector within housing 10. Except for battery 56 and antenna 34, the metal detector illustrated in FIG. 5 is embodied in circuit board 30. The metal detector includes a power supply, such as battery 56, connected through switch 58 to a voltage regulator 60. A switch operator 62 operates switch 58 to connect battery 56 to regular 60. In a preferred form of the invention, voltage regulator 60 provides a regulated 5 volt supply to the remainder of the circuit. As shown particularly in FIG. 1, switch may comprise a push button operator 62 protruding through aperture 64 in housing half 12 for operation by the user.

Pulse generator 66 provides a series of output pulses to antenna 34, which, in turn, provides a signal to pulse detector 68 for input to detector 72. The presence of metallic objects adjacent antenna 34 reduces the amplitude of the pulse from pulse generator 66 to pulse detector 68. Detector 72, which preferably includes a threshold circuit responsive to pulse amplitude, detects decay in the pulse amplitude to indicate the likely presence or absence of a metal object in close proximity to antenna 34. The circuit of FIG. 5 is largely embodied in a microprocessor commercially available as a VibraProbe™ detector from Bermnie Product Development Company, Inc. of Newbury Park, Calif.

Detector 72 provides outputs to operate buzzer 76 and light-emitted diode 78. In a preferred form of the invention, light emitting diode 78 is a red/green LED capable of emitting light at the red and green frequencies. Detector 72 operates LED 78 to the green mode when detector 72 determines that a metal object is not present adjacent antenna 34. Conversely, detector 72 operates LED 78 to provide a red output, and operates buzzer 76 to provide an audible output, when a metal object is adjacent or in close proximity to antenna 34. As shown particularly in FIG. 3, an aperture 80 through housing portion 12 supports LED 78 to be viewed by the user. Buzzer 76, on the other hands is mounted directly to the circuit board.

In use of the device, battery 56 is slid into battery cavity 12 and cover 26 closes the cavity, thereby biasing the battery against contacts 54 to power the unit. The hunter or archer removes an arrow point from an arrow shaft, and engages fastener 38 on housing 10 of the metal detector to the fastening recess 48 on the arrow shaft. The detector is securely fastened to the shaft by engaging the end of shaft 46 to the bottom of recess 48. The user operates switch 62 to activate the circuit, and, while holding the arrow shaft near the vanes, positions the paddle portion 18 of the metal detector adjacent locations that might contain the missing arrow. When antenna 34 comes into close proximity to the metallic point or shaft of the missing arrow, the circuit of FIG. 5 operates buzzer 76 and LED 78 to indicate the presence of the metal object. Initially, when the operator activates the circuit, detector 72 operates buzzer 76 to provide two short beeps and operates LED 78 flash the red output twice, thereby indicating proper operation of the circuit. Thereafter, detector 72 operates LED 76 to provide an intermittent green output while scanning, until a metallic object, such as the sought-for arrow, is located. After retrieving the missing arrow, the user may turn off the circuit and remove the metal detector from the arrow shaft, removing the arrow point to the shaft to return the arrow to its original form.

A typical arrow point is constructed of carbon or carbon composite material. A typical arrow shaft is constructed of carbon composite, aluminum, wood or an aluminum/carbon alloy. Typically, an arrow shaft has a length between about 28 and 39 inches (0.70 to 1 meter). The detector of the present invention is designed to detect aluminum, carbon and composite materials. Consequently, the arrow detector of the present invention will detect the arrow point and most shafts (other than wood) of arrows. Where the archer or hunter is using a wood shaft, the detector still operates to detect the point of the missing arrow. When the detector is mounted to an arrow shaft, the user, gripping the shaft near the vane, advantageously obtains an extended length, depending on the length of the shaft, to position the arrow detector near the ground. Housing 10 of the arrow detector is preferably constructed of a suitable ABS plastic as not to interfere with the operation of the antenna or circuit. Placement of the antenna at a position remote from fastener 48 on the handle portion of the housing, assures that the arrow shaft 46 to which the detector is mounted, does not interfere with operation of the metal detector. Hence, the stepped configuration of the housing serves to both advantageously place the antenna close to the ground to detect missing arrows, as well as to position the antenna away from the shaft 46 to avoid interference from the shaft to which the detector is mounted.

The present invention thus provides an effective metal detector for detecting the metallic arrow point or shaft of a missing arrow. Because the missing arrow is not likely to be deeply imbedded into the ground, the metal detector can be placed quite close to the missing arrow to gain detection. Consequently, the metal detector does not require high power as might be associated with traditional metal detectors employed by treasure hunters. In one form of the invention, the detector has a range of about 4 or 5 inches (10–13 cm), is about 10⅛ inches (26 cm) long, and about 2⅜ inches (6 cm) wide at the paddle region. The detector weighs (with the battery) about 6 ounces (170 grams). Consequently, the metal detector according to the present invention, is quite compact and lightweight and may be easily carried in the pocket of the user.

Although the present invention has been described with reference to preferred embodiments, workers skilled in the art will recognize that changes may be made in form and detail without departing from the spirit and scope of the invention.

What is claimed is:

1. A metal detector for mounting to an arrow shaft having a shaft fastener for attachment to an arrow point, the metal detector comprising:
    a housing;
    a housing fastener on the housing for fastening to the shaft fastener; and
    a detector supported by the housing, the detector including
        an antenna,
        a circuit connected to the antenna for detecting the proximity of metallic objects to the antenna, and
        an indicator connected to the circuit for indicating that the circuit detects the proximity of the antenna to a metallic object.

2. The metal detector of claim 1, wherein the antenna is positioned on the housing opposite the shaft fastener so that a user of the metal detector may grasp the arrow shaft to direct the antenna at ground locations likely to contain the metallic object.

3. The metal detector of claim 1, wherein the housing includes a generally planar paddle portion supporting the antenna and a generally planar handle portion, the planes of the paddle and handle portions being different and generally parallel so a user may orient the antenna in a plane closer to ground locations than the handle.

4. The metal detector of claim 3, wherein the arrow shaft defines a generally cylindrical external surface at an end of the shaft with the end of the shaft defining a gene rally planar end surface normal to a cylindrical external surface, the cylindrical surface defining a shaft diameter, an d the s haft fastener comprises a threaded recess in the end surface of the arrow shaft for receiving a threaded fastener of an arrow point, the housing fastener comprising a recess in the handle portion of the housing sized greater than the shaft diameter for receiving the end of the shaft, and a threaded fastener designed for fastening to the threaded recess on the arrow shaft extending into the recess so that the arrow shaft may be fastened to the housing.

5. The metal detector of claim 4, wherein the recess in the handle portion includes a generally planar bottom surface arranged to abut the end surface of the arrow shaft to secure the arrow shaft to the housing.

6. The metal detector of claim 3, wherein the detector includes a power source and a switch for connecting the power source to the circuit, the switch including a switch operator supported by the handle portion.

7. The metal detector of claim 6, wherein the indicator is supported by the handle portion.

8. The metal detector of claim 7, wherein the indicator includes a light emitting diode.

9. The metal detector of claim 8, wherein the indicator further includes an audible indicator.

10. The metal detector of claim 3, wherein the indicator includes a light emitting diode.

11. The metal detector of claim 10, wherein the indicator further includes an audible indicator.

12. The metal detector of claim 1, wherein the arrow shaft defines a generally cylindrical external surface at an end of the shaft with the end of the shaft defining a generally planar end surface normal to a cylindrical external surface, the cylindrical surface defining a shaft diameter, and the shaft fastener comprises a threaded recess in the end surface of the arrow shaft for receiving a threaded fastener of an arrow point, housing fastener comprising a recess in the housing sized greater than the shaft diameter for receiving the end of the shaft, and a threaded fastener designed for fastening to the threaded recess on the arrow shaft extending into the recess so that the arrow shaft may be fastened to the housing.

13. The metal detector of claim 12, wherein the recess in the housing includes a generally planar bottom surface arranged to abut the end surface of the arrow shaft to secure the arrow shaft to the housing.

14. The metal detector of claim 12, wherein the indicator includes a light emitting diode.

15. The metal detector of claim 14, wherein the indicator further includes an audible indicator.

16. The metal detector of claim 12, wherein the detector includes a power source and a switch for connecting the power source to the circuit, the switch including a switch operator supported by the housing.

17. A method of locating a missing arrow comprising the steps of:

providing a metal detector for detecting metallic parts of missing arrows, the metal detector having a fastener arranged to fasten to a shaft fastener at an end of an arrow shaft, the shaft fastener also being arranged to fasten to an arrow point;

fastening the fastener cf the metal detector to the shaft fastener so that the metal detector extends from the end of the arrow shaft; and operating the metal detector while the user grasps the arrow shaft and extends the arrow shaft to position the metal detector to locations likely to contain the missing arrow.

18. The method of claim 17, wherein the metal detector includes an antenna opposite the fastener of the metal detector.

19. The method of claim 17, wherein the metal detector includes an antenna, a generally planar paddle portion supporting the antenna, and a generally planar handle portion, the planes of the paddle and handle portions being different and generally parallel so the user may orient the antenna in a plane closer to ground locations than the handle.

20. The method of claim 19, wherein the fastener of the metal detector is on the handle portion of the metal detector.

* * * * *

UNITED STATES PATENT AND TRADEMARK OFFICE
CERTIFICATE OF CORRECTION

PATENT NO. : 6,266,006 B1
DATED : July 24, 2001
INVENTOR(S) : Jocelyn Audet

It is certified that error appears in the above-identified patent and that said Letters Patent is hereby corrected as shown below:

Column 1,
Line 22, "iii" should be -- in --.

Column 5,
Line 3, "an d the s haft" should be -- and the shaft --

Column 6,
Line 21, "cf" should be -- of --.

Signed and Sealed this

Eleventh Day of December, 2001

Attest:

NICHOLAS P. GODICI
Attesting Officer
*Acting Director of the United States Patent and Trademark Office*